United States Patent [19]

Sorg et al.

[11] Patent Number: 4,944,785
[45] Date of Patent: Jul. 31, 1990

[54] PROCESS USING MELT ACCELERATOR FOR THE CONVERSION OF SOLID WASTE SUBSTANCES INTO GLASS

[75] Inventors: Helmut Sorg, Glattbach; Helmut Pieper; Hartmut Zschocher, both of Lohr/Main; Heinz Merlet, Kelkheim, all of Fed. Rep. of Germany

[73] Assignees: SORG Gmbh & Co. KG, Lohr/Main; Metallgesellschaft AG, Frankfurt, both of Fed. Rep. of Germany

[21] Appl. No.: 370,593

[22] Filed: Jun. 23, 1989

[30] Foreign Application Priority Data

Dec. 13, 1988 [DE] Fed. Rep. of Germany ....... 3841889
Feb. 2, 1989 [DE] Fed. Rep. of Germany ....... 3904613

[51] Int. Cl.$^5$ .............................................. C03B 5/04
[52] U.S. Cl. ........................................ 65/136; 65/27; 422/168; 501/155
[58] Field of Search ................. 65/18.2, 27, 134, 136; 422/168; 501/155

[56] References Cited

U.S. PATENT DOCUMENTS

| | | |
|---|---|---|
| 3,397,972 | 8/1968 | Britchard et al. ............... 65/27 |
| 3,632,335 | 1/1972 | Worner ............................ 65/134 X |
| 4,110,097 | 8/1978 | Chevallier et al. ............... 65/136 |
| 4,299,611 | 11/1981 | Penberthy ...................... 65/27 |
| 4,358,304 | 11/1982 | Froberg .......................... 65/27 |
| 4,632,690 | 12/1986 | Coldwell ......................... 65/134 |
| 4,652,289 | 3/1987 | Drouett et al. .................. 65/27 |
| 4,666,490 | 5/1987 | Drake ............................. 65/27 |
| 4,687,493 | 7/1987 | Roberts et al. ................. 65/134 |
| 4,696,690 | 9/1987 | Roloff ............................. 65/27 |
| 4,820,328 | 4/1989 | Roberts et al. ................. 65/134 |

Primary Examiner—Robert L. Lindsay
Attorney, Agent, or Firm—Felfe & Lynch

[57] ABSTRACT

Waste substance such as incineration ash is mixed with cullet and alkaline earth salt to form a mixed batch which is added to a glass melt heated solely by electrodes, producing an exhaust gas which is introduced into the batch thereby cooling the gas to produce condensation products. The alkaline earth salt reacts with alkali in the gas and the condensation products to produce a gall layer of alkali salts and alkaline earth salts which serve as a melt accelerator and are readily removed when accumulated. According to a further step the gas is purified by separating dust therefrom and introducing it into the batch as a slurry.

12 Claims, 3 Drawing Sheets

PROCESS USING MELT ACCELERATOR FOR THE CONVERSION OF SOLID WASTE SUBSTANCES INTO GLASS

BACKGROUND OF THE INVENTION

The invention relates to a process for the conversion of solid, mostly dehydrated waste substances into glass, wherein the waste substances are mixed with one or several additives to form a batch to be melted. A major portion of the batch is melted into a glass melt by supplying heat and a minor portion is exhausted from the melting batch as an exhaust gas. Solid vitreous bodies are formed from the glass melt by means of casting and cooling. Furthermore, the invention relates to an apparatus for the working of this process.

It has long been known, to convert toxic and radioactive waste substances in the form of slurries or suspensions into glass by means of melting after mixing it with additives to form a batch. The formerly loose waste substances are now tightly incorporated in the glass. Glass possesses the advantageous property that it is difficult to leach out, thus permitting the release of heavy metal and other substances contained in the glass only to such a small extent that the storage or the use of bodies made of such glass does not cause any problems. Such processes are disclosed, for example, in U.S. Pat. Nos. 4,139,360 and 4,666,490. Furthermore, DE-A 3700382 (Pieper) specifies the incorporation of heavy metals in glass and calcium sulfate. They are integrated into the glass melt only to a very small extent during the melting process even if the chloride and sulphur capacity of the glass melt is completely saturated, which is due to the large amount of these substances present. Hence, large amounts of exhaust gas containing gases of chlorides and sulfate, especially Cl, HCl, $SO_2$, and SO, are a disadvantageous result. In contrast, heavy metals are sufficiently absorbed by the glass, but heavy metals and alkali still escape from the glass melt by means of vaporization. The most aggravating disadvantage of the known process, especially with regard to its environmental effects, is the formation or possible formation of dioxin and/or furan when the batch is heated during the melting process. This occurs when the waste substances to be converted still contain organic components, from which these harmful substances are formed under temperatures occurring during the melting of the batch.

Copending U.S. application Ser. No. 07/370,595, incorporated herein by reference, addresses the foregoing disadvantages and provides a process which is less harmful to the environment and excludes especially the emission of dioxin and/or furan even if heterogeneous, organic components as well as heavy metal are employed. According to the process, the waste substance is incineration ash, and hot exhaust gas is withdrawn under exclusion of surrounding air and reintroduced into the batch to be melted where it is cooled down to 20° to 50° C. Condensation products resulting from the cooling process are melted with the batch, and the cold exhaust gas emerging from the batch to be melted is purified.

The process permits the conversion of a so far very problematic waste substance, i.e. incineration ash, into glass in an ecologically beneficial way despite the fact that such ash products are heterogeneous and consist of high and unstable percentages especially of carbon, mercury, lead, tin, zinc, calcium, chlorides, and halides. A major portion of these harmful substances is directly integrated into the glass melt, hence, they are tightly incorporated. Harmful substances escaping as gases are mostly condensed by cooling within the batch to be molten and then reintroduced into the melting mass. The remaining, relatively small amount of cold exhaust gases are neutralized in a subsequent purification process.

For additional details, the reader is referred to said application.

SUMMARY OF THE INVENTION

It is an object of the present invention to improve the heat transfer from the glass melt to the batch to be melted. To this end a liquid gall layer of alkali salt or alkaline earth salt is generated on the glass melt surface covering the batch; if necessary, this layer can be removed so as to maintain a layer thickness between 2 and 5 cm. In addition to an acceleration of the melting process, a part of the harmful substances emerging from the melting batch is absorbed by the gall layer and the exhaust gas is correspondingly less harmful. The removed alkali salt gall containing harmful substances can be reintroduced to the process after cooling and solidification; the harmful substances of the gall layer gradually pass over into the glass melt.

A gall layer consisting basically of $Na_2SO_4$, NaCl, $K_2SO_4$, KCl, $Li_2SO_4$, LiCl or a mixture of these is preferred. This gall layer is produced during the melting process by adding $CaSO_4$, $Cacl_2$, $MgSO_4$, $Mgcl_2$ or a mixture of these to the melting process together with the incineration ash and/or as a separate additive to the batch. The alkaline earth salts react with alkali in the gas and in the condensation products in the batch to form the alkali salts in the gall layer. Alternatively, a calcium sulfate and/or a magnesium sulfate gall layer is used for high melting temperatures or if there is no alkali; the gall layer is produced directly from the calcium sulfate and/or magnesium sulfate. The additional costs involved are low as compared to what is saved for purification, thus decreasing the total costs of the entire process.

DETAILED DESCRIPTION OF THE PREFERRED EMBODIMENTS

Figure 1:
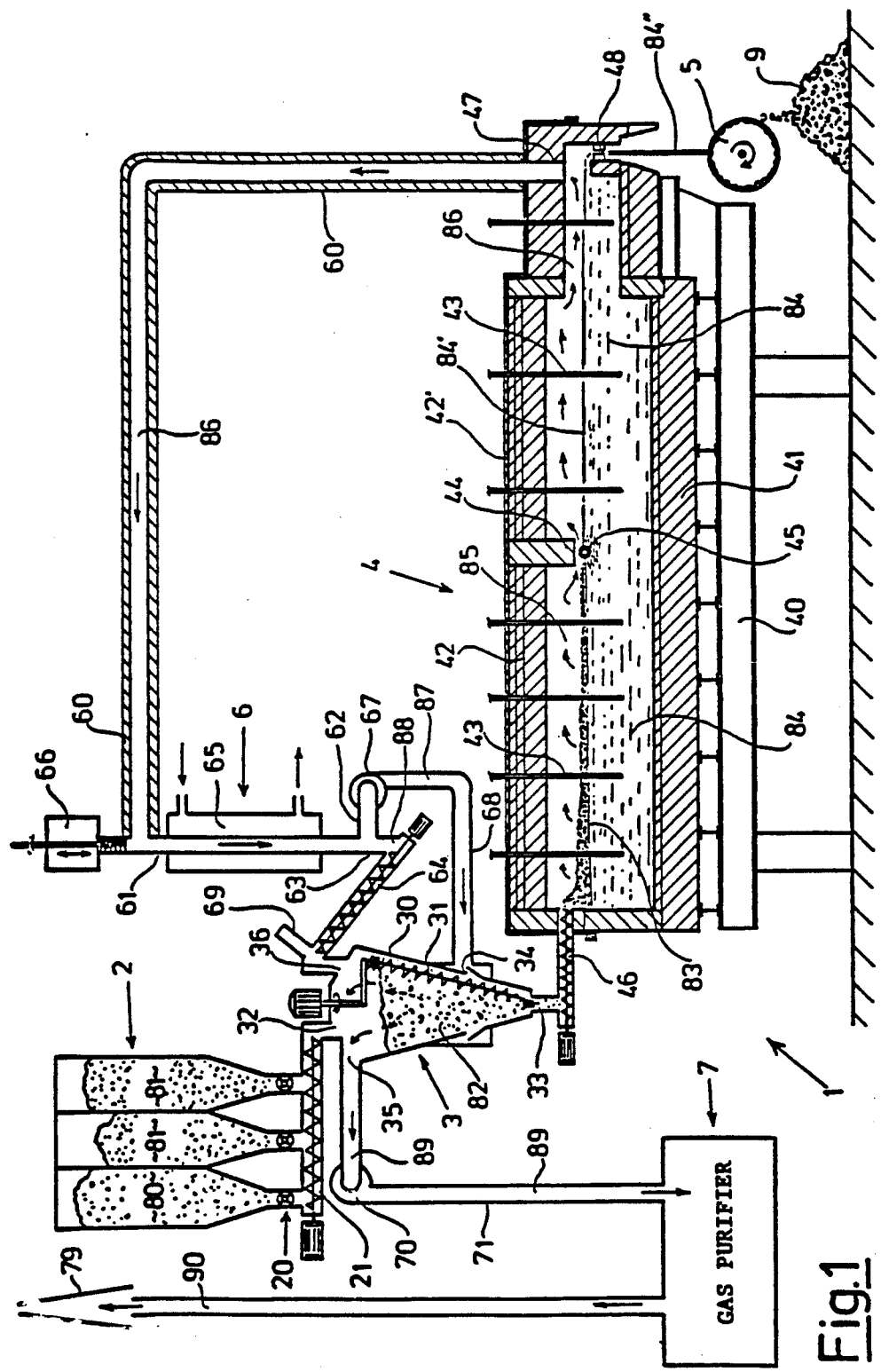
FIG. 1 is a diagrammatical cross section view a suitable furnace and associated apparatus.

FIG. 1 shows supply vessels 2, batch mixer 3, a glass melting furnace 4, a glass working machine, an exhaust gas cooler 6, and a gas purification device 7.

The supply vessels 2 serve to hold and store incineration ash 80 and additives 81, which may include the alkaline earth salts and the dust or slurry from the exhaust gas. The bottom end of each supply vessel 2 is provided with a dosing sluice 20, for example a cellular wheel sluice. These dosing sluices end in a common conveyor device 21, in this case a screw conveyor, which leads to the top of the batch mixer 3. The batch mixer 3 consists of a funnel-like housing 30 and a mixing screw 31 disposed in housing 30. The mixing screw 31 runs parallel to the inner side of the lateral wall of housing 30; it can be rotated around its own axis as well as around an axis running vertically through the center of the housing 30 of the batch mixer. The upper part of housing 30 is provided with a solid substance inlet which is connected with the above mentioned conveyor device 21. The bottom end of housing 30 of the batch mixer 3 is provided with a solid substance outlet leading to a batch conveyor 46. The batch conveyor 46 is already part of the glass melting furnace 4. The glass melting furnace 4 includes a tank 41 of fire-proof material covered by a superstructure 42, also made of fire-proof material. The tank 41 and the superstructure 42 rest on a support configured as steel girders. The external furnace of the superstructure 42 of the glass melting furnace 4 has a gastight cover 42' consisting of sheet steel. The cover 42' reaches up to the top rim of tank 41 to which it is joined in a sealed connection. From the top downward, heating electrodes 43 pass through the superstructure 42 and the cover 42' into the interior of the glass melting furnace 4. The interior of glass melting furnace is subdivided into two different areas: a melting area, which is represented on the left side of FIG. 1, and a heating area, which is represented on the right side of FIG. 1. A suspended and straight arch 44 subdivides the glass melting furnace into said areas. This arch 44 protrudes downwardly and is configured as a part of the superstructure 42 from which it is suspended. During operation of the glass melting furnace 4 this arch 44 is close to the surface 84' of a glass melt 84 contained in the furnace 4, and serves as a perpendicular dividing wall to form the gas area of furnace 4. Furthermore, under arch 44 there is a coolant tube 45 which runs parallel to this arch across the glass melting furnace. The coolant tube 45 passes exactly at the same level with the surface 84' of the glass melt 84 and causes the glass melt 84 to solidify in the area surrounding the tube 45. The right end of the glass melting furnace is provided with a glass melt outlet 48 where diagrammatically represented glass working machine 5 is added. Finally, the right end of the glass melting furnace 4 is also provided with an upward exhaust gas outlet 47 passing through the superstructure 42.

A heat insulated gas pipe 60 from the exhaust ga outlet 47 of the glass melting furnace 4 to the gas inlet 61 of the exhaust gas cooler. In addition to the gas inlet 61, the exhaust gas cooler 6 is also provided with a gas outlet 62 and an outlet 63 for condensation products. Both outlets are disposed on the bottom end of exhaust gas cooler 6. Furthermore, the exhaust gas cooler 6 is furnished with a device 65 for the feeding as well as the supply and the discharge of a coolant, e.g., cooling water or cooling air. On top of the exhaust cooler 6, a mechanical cleaning device 66 is indicated by means of which the gas containing parts of the exhaust gas cooler 6 are continuously or periodically cleansed of the condensation products which result from exhaust gas cooling. The condensation product outlet 63 of the exhaust gass cooler 6 is connected to the feeding side of the batch mixer 3, i.e. to the upper part of its interior, via another conveyor device 64, in this case also a screw conveyor. For this purpose, the upper part of the housing 30 of the batch mixer 3 is provided with a condensation product inlet 36. If required, the condensation products can be discharged either partially or completely via a switch 69 which is disposed on the upper end of the conveyor device 64.

A first suction fan 67, whose end is joined to a connecting pipe 68, is disposed downstream of the gas outlet 62 of the exhaust gas cooler 6. The connecting pipe 68 leads to a gas inlet 34 of the batch mixer 3. The gas inlet 34 is disposed in the bottom part of the housing 30, and is configured to permit the gas to enter the interior of the housing 30, but to prevent any batch discharge from the interior of housing 30 into pipe 38.

A gas outlet 35, followed by a second downstream suction fan 70, is disposed on the opposite end of gas inlet 34, i.e. on the upper end of batch mixer 3. The power of the first suction fan 67 and of the second suction fan 70 can be controlled, preferably by a common control device. A gas pipe 71 leads from the outlet of the second suction fan 70 to a gas purification device 7 whose components are generally known and are therefore not listed in detail. Finally, a chimney 79 is disposed downstream of the outlet of the gas purification device 7.

Additional embodiments of the furnace and associated apparatus are disclosed in U.S. application Ser. No. 07/370,595, incorporated herein by reference.

The following is a description of how the process works, based on the apparatus described in FIG. 1.

Incineration ash 80 from a refuse incinerator or a garbage disposal plant is fed to the first supply vessel 2. The remaining supply vessels 2 are charged with the necessary additives 81, especially sand and phonolite and, if required, cullet. Additional additives would include the alkaline earth salts or dust, as will be described in greater detail in conjunction with FIG. 4. By means of the dosing sluices 20, premeasured amounts of incineration ash 80 and additives 81 are taken from the supply vessels 2 and fed via conveyor device 21 to vessel 30 of batch mixer 3, where the individual components are mixed by a mixer screw 31 in order to form a homogeneous batch 82 which can be molten. The prepared batch 82 is fed through the solid substance outlet 33 of the batch mixer to the interior of the glass melting furnace 4 by means of the batch charging device 46. During operation, the glass melting furnace 4 is filled with glass melt 84 up to a certain level. The surface 84' of the glass melt 84 is exactly at the same level with the coolant tube 45 and just below the arch 44.

The batch which is supplied by the batch charging device floats as a melting batch 83 on the glass melt 84 and is distributed on the surface 84' of the latter in the melting area (left part) of the glass melting furnace 4. A solidification of the glass melt 84 in the area surrounding the coolant tube caused by a coolant passing through the latter prevents the melting batch 83 from passing beyond the arch 44 and the coolant tube 45. The heat energy required for the melting of the batch 83 is generated as joulean heat by heating electrodes 43, whose bottom ends protrude into the glass melt 84 which, in turn, assumes the function of an ohmic resistor.

During the melting process, gases escape from the batch 83 with an exhaust gas temperature between 100° C. and 1000° C. Basically, this exhaust gas can contain $SO_2$, HCl, chloride, sulfates, carbon dioxide, alkali and heavy metal vapor, and dioxin and/or furan.

This exhaust gas 85 enters the right side of the interior of the glass melting furnace 4 through a crack between the bottom of arch 44 and the coolant tube 45. The surface 84' of the glass melt 84 in this part of the glass melting furnace 4 is free of batch. The glass melt 84 contained in this part of the glass melting furnace 4 has a temperature of approximately 1400° C. Hence, the temperature in the upper part of the glass melting furnace 4 above the melt 84 amounts to at least 1300°-1350° C. To achieve the highest possible temperature it is advantageous to provide the superstructure 42 of the glass melting furnace 4 with a best possible insulation. The gas entering this area of the glass melting furnace 4 is reheated by absorbing heat from the glass melt. An appropriate adjusting of the flow rate and a corresponding selection of the dimensions of glass melting furnace causes the temperature of the hot exhaust gas to amount to at least 1200° C. for a period of at least 1.5 seconds. Thus, the dioxin and/or furan which is possibly contained in the exhaust gas is definitely eliminated; consequently the hot exhaust gas contains only the chlorides, sulfates, carbon dioxide and the alkali and heavy metal vapors.

This hot exhaust gas is exhausted through the heat insulated pipe 60. Basically, the insulation serves to prevent a cooling and thus a subsequent condensation of the hot exhaust gas 86 within the pipe 60. The hot exhaust gas is fed through gas inlet 61 to exhaust gas cooler 6, where it is cooled down to a temperature between 300° and 500° C., a process whereby a part of the exhaust gas is condensed and deposited within the exhaust gas cooler 6. The resulting condensation products 88 are removed continuously or periodically by means of a cleaning device 66 and fed to condensation product outlet 63 which is below the exhaust gas cooler 6. The condensation products 88 are fed via conveyor device 64 through condensation product inlet 36 to the interior of the batch mixer 3 and thus reintroduced into the batch to be molten. If necessary, the condensation products can be removed completely or partially via outlet 69.

The pre-cooled exhaust gas 87 exits the exhaust gas cooler via gas outlet 62 and reaches the first suction fan 67, which generates at its intake, i.e., within the exhaust gas cooler 6, in the pipe 60 and in the glass melting furnace 4, a pressure less than the pressure of the surrounding air. On the side facing towards the conveyor, the pre-cooled exhaust gas passes through the connecting pipe 68 towards the batch mixer 3 at a pressure higher than the pressure of the surrounding air. This pre-cooled exhaust gas 87, being under a superatmospheric pressure, is fed into the batch 82 contained in the interior of the batch mixer 3 via gas inlet 34. While the exhaust gas 87 is passing through, it condenses and thereby is cooled down to approximately 20°-50° C. It emerges from the surface of the batch 82 as a cold exhaust gas. In addition to the mixing of the individual batch components, the mixer screw 31 keeps the batch loose and permeable to gas. Due to the intense cooling, even low condensing vapor e.g. heavy metal vapor condenses within the batch 82 to be molten. The cold exhaust gas 89 escaping through gas outlet 35 of the batch mixer 3 contains basically only HCl and $SO_2$.

Interacting with a corresponding control unit and a pressure sensor, it is the purpose of the second suction fan 70, which is disposed downstream of the gas outlet 35, to maintain the pressure of the cold exhaust gas 89 in the upper part of the batch mixer at approximately the same level with the pressure of the surrounding air. This prevents the intrusion of exhaust gas and additional air into the system.

The cold exhaust gas 89 which is basically a concentrated gas is fed to the gas purification device 7 via pipe 71 where it is subject to purification. The remaining exhaust gases 90, especially $N_2$, $CO_2$ and small amounts of oxygen, which escape from the gas purification device are finally exhausted into the environment through chimney 79. The relatively harmless components of the remaining exhaust gas 90 are not hazardous or pollutant to the environment.

The apparatus 1 provides, in addition to the remaining exhaust gas, a vitreous body 9 which can be reused as a raw material for further industrial purposes. These viterous bodies 9 are manufactured continuously from the discharged glass melt 84″ by means of a glass working machine 5. These vitreous bodies can be used, for example, as ballast or concrete additives.

The size of the glass melting furnace 4 and hence the volume of the glass melt 84 contained therein are advantageously selected to be large enough so that deviations in the composition of the incineration ash, which might occur, do not suddenly change the entire chemistry of the molten glass. Changes of the glass melt composition 84 can be determined very quickly, e.g. by changes in the electrical resistance of the glass melt 84 between the electrodes. These measured values can be used to control the mixture of the incineration ash 80 and the individual additives, especially additives with a certain alkali percentage, e.g. phonolite.

Figure 2:
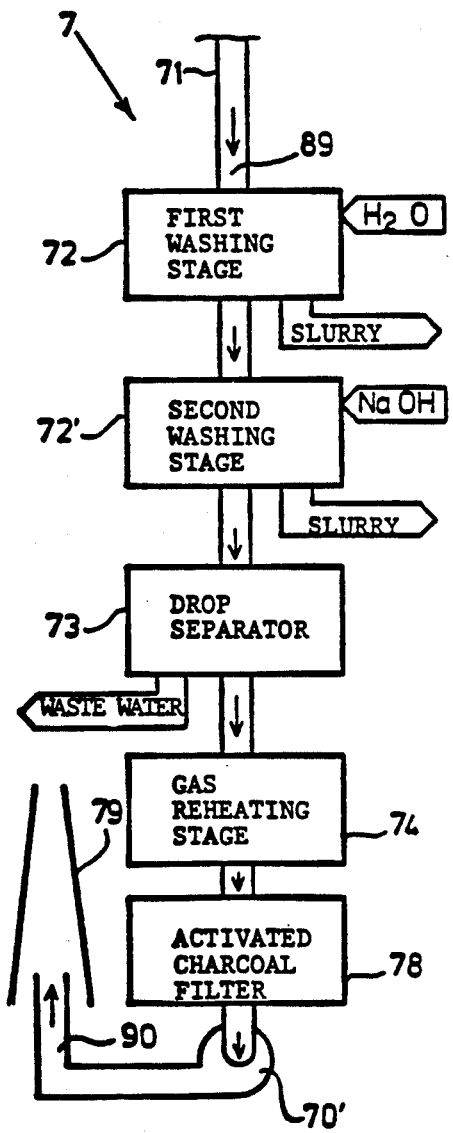
FIG. 2 is a schematic of a first embodiment of gas purification device.
Figure 3:
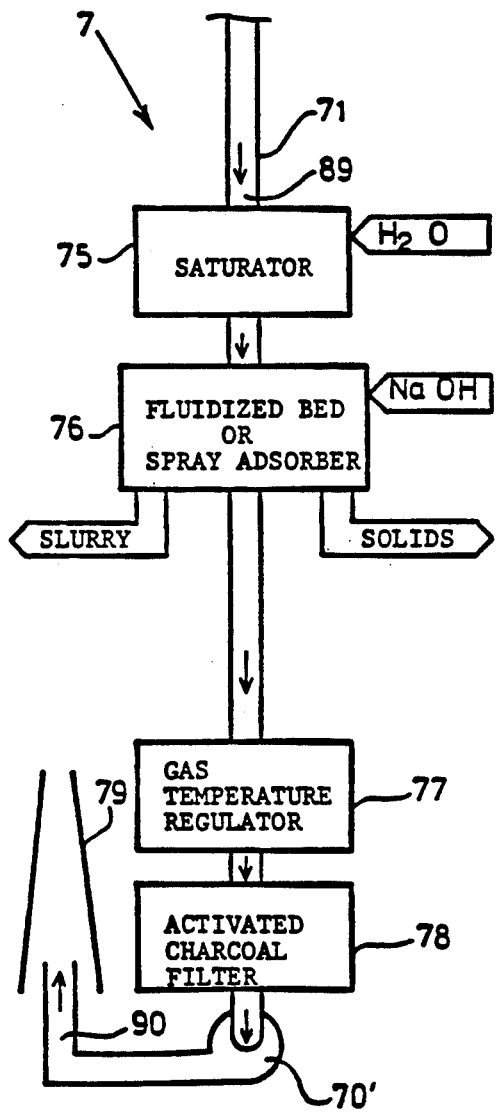
FIG. 3 is a schematic of a second embodiment of gas purification device.

Another possibility for monitoring the composition of the glass melt 84 is to examine the crystallization of the final glass product. Glass compositions within certain limits form certain crystals which can be easily recognized in the final glass. They indicate if and how the composition of the glass has been modified. The amount of the incineration ash 80 and the additives to be added can then be correspondingly adapted. FIGS. 2 and 3 show two embodiments of the gas purification device 7. FIG. 2 represents a wet cleaning device 7, and FIG. 3 a dry or semi-dry cleaning device 7.

According to FIG. 2, the cold exhaust gas 89 is fed through pipe 71 to a first purification stage 72. This first purification stage serves to wash out especially HCl gas from the exhaust gas. In a second purification stage 72' $SO_2$ is washed out. A subsequent drop separator 73 separates the water drops which were dragged along. In a gas reheating stage 74, the gas is reheated to an appropriate temperature between 30° and 90° C. and subsequently fed through an activated carbon filter stage 78. After passing this stage the remaining exhaust gas 90 consists basically of $N^2$, $CO_2$, and small amounts of oxygen which are exhausted into the environment via chimney 79.

For the HCl separation in the first purification stage 72, an acid, preferably of pH less than 1, has to be selected. For the separation of $SO_2$ in the second purification stage 72', however, a pH of 6-7.5 is preferred. Preferably, both purification stages 72 and 72' operate on reversed current, however, direct current is also possible. Mercury which is possibly present in the exhaust gas 89 is separated in the activated charcoal filtering stage. The amount of waste water and slurry resulting from the purification stages 72 and 72' and from drop separator are fed advantageously to a waste-water purifying plant.

The second embodiment of the gas purification device 7, shown in FIG. 3, has as a first component a saturator 75 to which the cold exhaust gas 89 is fed, also via pipe 71. Once the exhaust gas is saturated with water in the saturator 75, it is introduced to a fluidized bed or a spray adsorber 76. Preferably, NaOH or Ca(OH) in watery solution are admitted to the spray adsorber. In a gas temperature regulating stage 77 the escaping gas is brought to an optimum temperature for the subsequent activated charcoal filtering stage 78. The finally remaining exhaust gas which escaped is exhausted into the environment through chimney 79.

The waste waters and the solid substances resulting from this process are subject to further purification, e.g. in a waste-water purification plant or are dumped or reused.

Due to the relatively simple, defined composition of the exhaust gas 89, the gas purification devices serve to recover sodium chloride and sodium sulfate in a relatively pure form. These raw substances, in turn, can be used for the manufacture of soda.

Figure 4:
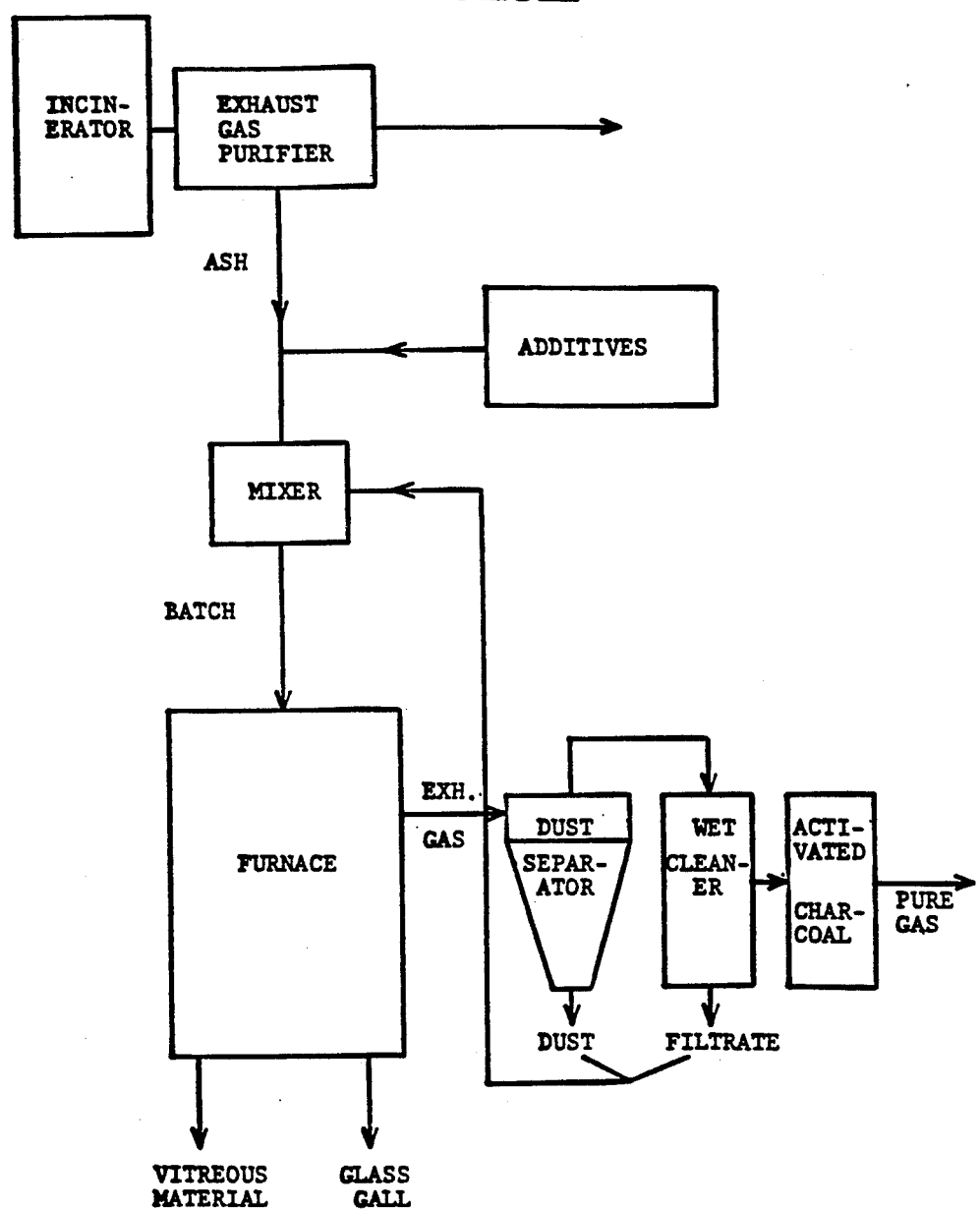
FIG. 4 is a flow diagram of a system of removing dust from the exhaust gas.

FIG. 4 shows a flow diagram for a purification device which separate dust from the exhaust gas. Small amounts of exhaust gas are subject to dust separation in the dust separator either directly, or after passing through the batch, and then undergo a wet cleaning process. The exhaust gas is then passed through an activated charcoal filter, permitting the resulting pure gas to be exhausted into the air.

It is surprising to achieve an essential decrease of the environmental lead by adding the separated dust, the filtrate resulting from the wet cleaning, and the slurries from the gas purification to the incineration ash and additives. The mixed batch is then introduced into the glass melting furnace.

Advantageously, only two different substances are discharged from the process. One is the glass material, which can be used for road construction or similar purposes. The other is the glass gall consisting of salts whose solubility is exceeded in the glass melt during the melting process at the temperature of the melt.

Apart from glass, products resulting from the inventive process are glass gall, dust, and/or slurry which have to be deposited or further processed if they are not used as a construction material like the glass.

It is thus a further object of the invention, to solve the problem of substances resulting from the melting of incineration ash in glass, which substances have not been deposited at all, or only to a small extent. The process should operate inexpensively, by means of conventional industrial apparatus, and should be safe and troublefree.

This further object is achieved, by adding dust resulting from gas purification into the batch, which dust may be in slurry form to facilitate handling.

In order to have an absolutely harmless pure gas, the exhaust gas is fed through an activated charcoal filter after purification. In order to concentrate the exhaust gas, it is advantageous to cool it before and after purification.

The total amount of harmful substances discharged from the process is reduced by those substances resulting from the gas purification and the heavy metals contained in the melt. Since the solubility for the heavy metals contained in the glass melt, and in a broader sense for all metals contained therein, is not exceeded during the process, all heavy metals are incorporated in the glass, where they cannot be leached out, by reintroduction into the glass melt.

It is further surprising that the glass gall residue is relatively clean. This is due to the fact that a larger amount of gall, as compared to the process, permits a more exact separation and the gall thus reaches also a higher degree of purity. It is possible to use this glass gall as a raw material for chemical purposes. The glass gall percentage amounts to approximately 5–10% of the incineration ash employed.

We claim:

1. Process for converting solid, dehydrated waste substance into glass, comprising mixing the waste substances with at least one additive to form a mixed batch, generating a gall layer of alkali salt or alkaline earth salt on the surface of a glass melt heated solely by electrodes, and introducing the mixed batch onto said glass melt surface so that a major portion is melted into the melt and a minor portion produces an exhaust gas emerging from the melt, said gall layer serving as a melt accelerator, introducing the exhaust gas into the batch to be melted, thereby cooling said gas and producing condensation products in the batch, and reintroducing said condensation products into the melt with the batch.

2. Process as in claim 1 wherein part of said gall layer is periodically removed to maintain a thickness between 2 and 5 cm.

3. Process as in claim 1 wherein said exhaust gas and the resulting condensation products contain alkali therein, said gall layer comprising one or more alkali salts from the group consisting of $Na_2SO_4$, $K_2SO_4$, $Li_2SO_4$, and $LiCl$, said gall layer being generated during the melting process by adding one or more alkaline earth salts from the group consisting of $CaSO_4$, $CaCl_2$, $MgSO_4$, and $Mgcl_2$, said alkaline earth salts reacting with said alkali to produce said alkali salts.

4. Process as in claim 3 wherein said alkaline earth salts are added to the melt with the batch.

5. Process as in claim 3 wherein said alkaline earth salts are added to the melt separately from the batch.

6. Process as in claim 1 wherein said gall layer comprises one or more alkaline earth salts from the group consisting of $CaSO_4$ and $MgSO_4$.

7. Process as in claim 6 wherein said exhaust gas and the resulting condensation products contain little or no alkali.

8. Process as in claim 1 wherein said solid, dehydrated waste substance is incineration ash.

9. Process as in claim 1 further comprising purifying the exhaust gas emerging from the batch to be melted, said purifying comprising removing dust from said exhaust gas and reintroducing said dust into the batch to be melted.

10. Process as in claim 9 wherein said dust is slurried before being reintroduced into said batch.

11. Process as in claim 9 wherein said exhaust gas is cooled before purification.

12. Process as in claim 9 wherein said exhaust gas is cooled after purification.

* * * * *

UNITED STATES PATENT AND TRADEMARK OFFICE
CERTIFICATE OF CORRECTION

PATENT NO. : 4,944,785

DATED : July 31, 1990

INVENTOR(S) : Sorg et al.

It is certified that error appears in the above-identified patent and that said Letters Patent is hereby corrected as shown below:

Column 3, line 35, after "furnace" insert -- 4 --.

Column 3, line 45, delete "ga" and insert -- gas --.

Column 8, lines 33 and 34, after "$Na_2SO_4$," insert -- NaCl, --; after "$K_2SO_4$," insert -- KCl, --.

Signed and Sealed this

Twenty-ninth Day of September, 1992

Attest:

DOUGLAS B. COMER

*Attesting Officer*    *Acting Commissioner of Patents and Trademarks*